(12) United States Patent
Torniainen et al.

(10) Patent No.: US 6,306,238 B1
(45) Date of Patent: Oct. 23, 2001

(54) THERMAL ANNEALING OF PLASTIC PIECES

(75) Inventors: Paul M. Torniainen, Plymouth; William E. Archibald, Maple Grove; John Daugherty, Eden Prairie, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/329,698

(22) Filed: Jun. 10, 1999

(51) Int. Cl.⁷ .......................... B29C 35/08; B29C 49/24; B29C 49/64; B29C 71/02; B29C 71/04
(52) U.S. Cl. .......................... 156/245; 264/232; 264/235; 264/237; 264/328.16; 264/327; 264/346; 264/348; 264/442; 264/492; 264/509; 264/523; 264/534; 264/537
(58) Field of Search .......................... 156/245; 264/232, 264/235, 237, 328.16, 327, 346, 348, 442, 492, 509, 523, 534, 537

(56) References Cited

U.S. PATENT DOCUMENTS

| | | |
|---|---|---|
| 3,555,135 | 1/1971 | Paul . |
| 4,311,660 | 1/1982 | Barham et al. . |
| 4,411,610 | 10/1983 | Poppe et al. . |
| 5,288,450 | 2/1994 | Koizumi et al. . |
| 5,489,404 | * 2/1996 | Le Grand et al. .................. 264/235 |

OTHER PUBLICATIONS

Journal of Plastic Film & Sheeting, Jan. 1999, Stress Relaxation in Semi–Crystalline PEN Films: Physical Aging Effects, vol. 15.
Norbert M. Bikales, Wiley–Interscience, 1971, Mechanical Properties of Polymers.
Brostow/Corneliussen, Hanser Publishers, 1986, Failure of Plastics, p. 221.
L.C.E. Struik, Elsevier, Amsterdam, 1978, Physical Aging in Amorphous Polymers and Other Materials.

* cited by examiner

Primary Examiner—Leo B. Tentoni
(74) Attorney, Agent, or Firm—John A. O'Toole; Douglas J. Taylor; Everett G. Diederiks

(57) ABSTRACT

Methods of thermal annealing of plastic pieces immediately after hot melt forming are disclosed to accelerate the time required to achieve dimensional stability. The present methods include the essential steps of: (A) forming molten plastic into molded plastic pieces and rapidly cooling to below the melting point of the plastic in a mold to form shaped cooled plastic pieces; (B) immediately thereafter, heating the plastic pieces to a temperature of about 150° to 170° F. (65.5° to 80° C.) to form heated plastic pieces; and, thereafter, (C) cooling the heated plastic pieces to room temperature to form thermally annealed plastic pieces. In its product aspect, the present invention resides in physically aged thermoplastic pieces having reduced rates of age shrinkage.

19 Claims, 1 Drawing Sheet

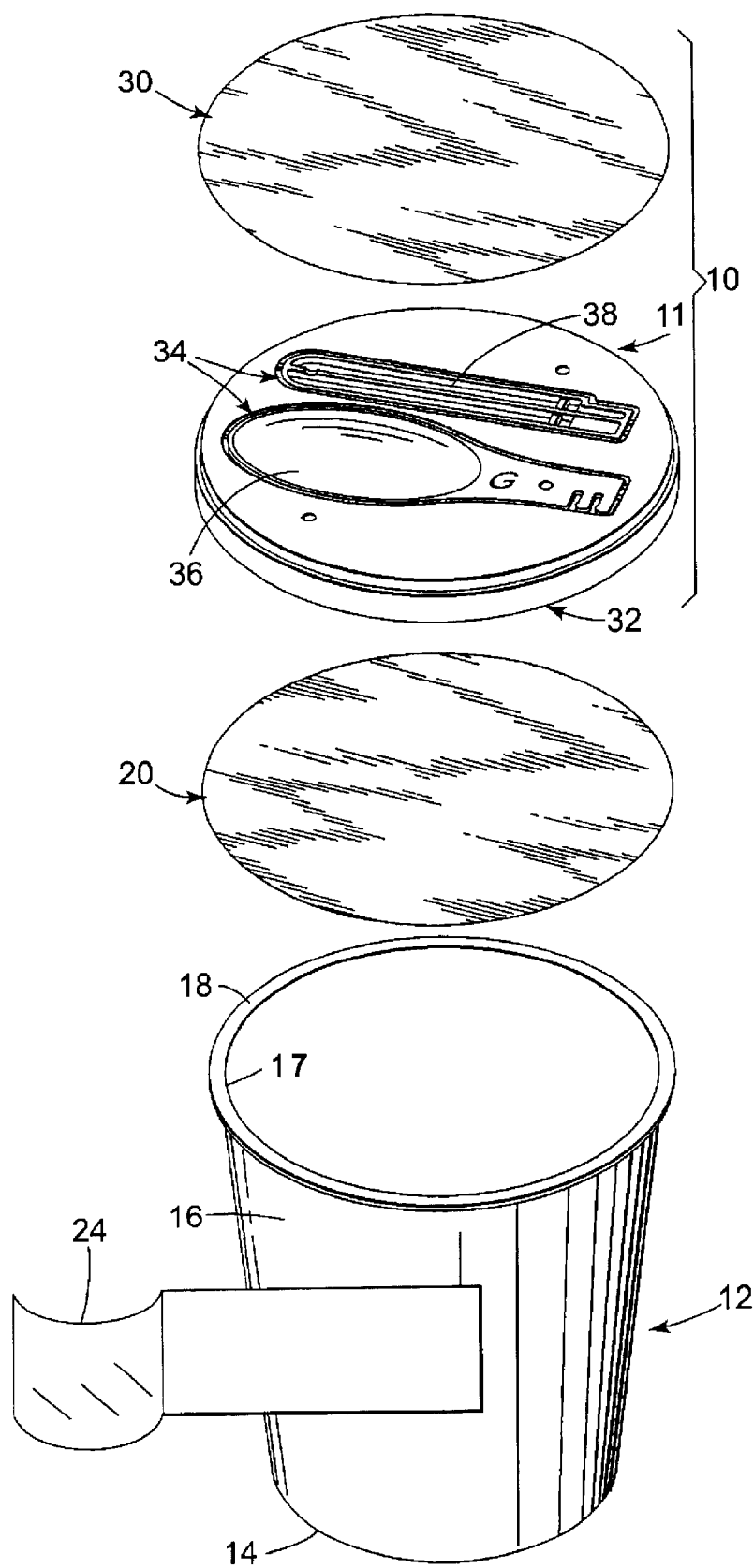

THERMAL ANNEALING OF PLASTIC PIECES

FIELD OF THE INVENTION

The present invention relates to improvements in methods for preparing injection molded plastic pieces. More particularly, the present invention relates to heating plastic pieces immediately after injection molding to accelerate shrinkage.

BACKGROUND OF THE INVENTION

The present invention provides further improvements in fabricating plastic pieces such as lids for food containers that is disclosed in U.S. Ser. No. 09/249,401 entitled "Portable Food Container Cover With Detachable Utensil" (filed Feb. 12, 1999 and which is incorporated herein by reference, attorney docket 5202). The patent application describes improved plastic cover lids for food containers that include a detachable two piece utensil.

The covers are taught as being useful for food containers such as for refrigerated yogurt. In the fabrication of these plastic pieces, plastic resin is melted to form a hot melt plastic that is fed into a blow molding or injection molding device. In the mold, the hot plastic is formed into desired shape and is quickly cooled to about room temperature to form solid pieces, that are then ejected or otherwise removed from the injection molding device.

Frequently, it is desirable to apply a label to formed plastic pieces. For example, the described two piece utensil includes a protective membrane overlaying the cover to keep the utensil clean. In other applications, a food label may be desired to adhere, for example, to the side wall of a bottle or to an open end as a tamper evidence seal.

One problem with applying a label to a molded plastic piece is that such pieces continue to shrink modestly even when kept at room temperature. While pieces continue to shrink over time, most shrinkage occurs during the first 48 hours after molding. It is speculated that this shrinkage is due to gradual release of stress locked into the pieces during formation. This shrinkage over time is sometimes referred to in the art as "aging".

Although the shrinkage is minute, if a label is applied before substantial completion of the shrinkage, then the label may be rendered defective. For example, the label may appear wrinkled or may rupture. For labels that are intended to seal the container, stretch gaps can develop leading to the loss of seal integrity. Premature product spoilage can occur. As a result, in-line labeling (i.e., labeling shortly after lid fabrication) in many applications heretofore has not been practical.

In the past, such shrinkage has been considered in the art to be a natural and unavoidable problem. One possible solution to shrinkage problems is to warehouse the pieces for a period of time until acceptable dimensional stability occurs. However, such an approach especially in mass production requires expensive inventory, space and containers to house the inventory and further requires expensive additional handling. Also, product contamination is more likely with warehousing and increased handling.

A wide variety of approaches tried by the inventors fail to solve the problem of shrinkage. For example, various modifications to the film composition for the label have been tried unsuccessfully. Alternate adhesives for the label have likewise failed. Various fillers have been added to the plastic pieces to attempt to arrest the shrinkage have been unsuccessful.

After many failed attempts, surprisingly, the present invention provides a solution for the problem of gradual shrinkage over extended times in plastic pieces.

In one important aspect, the present invention resides in thermal annealing or temperature aging of the plastic pieces to accelerate expected shrinkage to provide substantially dimensionally stable plastic pieces suitable for immediate labeling.

The present invention provides the important advantage of in-line labeling. As a result, a continuous fabrication process is possible including applying a label within minutes of piece forming.

A further advantage is that the risks and expensive inventory and warehousing are substantially reduced.

Reductions are also provided in the type number and degree of defective labels.

A further advantage resides in increases in rates of production permitted by the present invention.

Still another advantage is that plastic pieces that are relatively more dimensionally stable can be provided immediately after fabrication for uses other than for labeling.

Still another surprising advantage resides in the simplicity of the present improvements.

Additional features and advantages of the present invention are described in, and will be apparent from, the detailed description of the presently preferred embodiments taken in conjunction with the Drawings, in which:

BRIEF DESCRIPTION OF THE DRAWINGS

FIG. 1 is a perspective, exploded view of a plastic article comprising a cover with a first label in accordance with the present invention, shown in conjunction with a portable food container having second and third labels.

SUMMARY OF INVENTION

In its method of preparation aspect, the present invention resides in methods of thermal annealing of plastic pieces to accelerate the time required to achieve dimensional stability. The present methods comprise the essential steps of:

A. forming molten plastic into molded plastic pieces and rapidly cooling to below the melting point of the plastic in a mold to form shaped cooled plastic pieces;

B. immediately thereafter, heating the plastic pieces to a temperature of below the temperature of crystallization about 150° to 170° F. to form once heated plastic pieces; and, thereafter, C. cooling the heated plastic pieces to room temperature to form thermally annealed plastic pieces.

In its product aspect, the present invention resides in thermally annealed dimensionally stable thermoplastic pieces having reduced rates of age shrinkage especially those prepared by the present methods of preparation.

DETAILED DESCRIPTION OF THE INVENTION

For purposes of illustration, FIG. 1 shows a plastic piece containing article 10. Article 10 includes a first plastic piece 11 in the nature of a cover adapted to be remolrably secured to a second plastic piece in the nature of a portable food container 12. The container 12 contains a food item such as yogurt (not shown) and includes a base 14 and a side wall 16. The side wall 16 extends upwardly from the base 14 and forms an outwardly projecting lip 18 flange, or seal bead at an open end opposite the base 14. In general terms, the container 12 is sized to be portable, preferably maintaining a single serving of food. Because the container 12 is in direct contact with food, a plastic material approved for food contact should be employed, as is well known in the art.

In one such embodiment, the cover 11 includes a first label in the form of a protective film 30, a cover body 32 and a utensil (shown generally at 34). The cover body 32 is configured to selectively receive or removably secure to the lip 18 formed in the container 12. The utensil 34 includes a head piece 36 and a handle piece 38, each of which are detachably secured to the cover body 32. In one preferred embodiment, the utensil 34 is a spoon, with the head piece 36 configured as a bowl piece. As described below, however, the utensil 34 may assume a wide variety of forms, including a fork, spork or knife. Finally, the protective film 30 is resealably secured to the cover body 34.

The protective film 30 provides a sanitary seal for the head piece 36 and the handle piece 38, and is preferably shaped in accordance with the cover body 32. Thus, in the embodiment shown in FIG. 1, where the cover body 32 is generally circular, the protective film 30 is likewise circular in shape. If cover body 32 were oval or even square, then protective film would be similarly shaped. While a wide variety of film materials can be used for the protective film 30, the material selected preferably exhibits a high degree of clarity, such as that found with polystyrene (PS). To this end, PS facilitates rapid manufacture in that PS is relatively stiff and is therefore readily removable from a backing material. It should be noted, however, that any other similar polymer-type film can be employed. To this end, the protective film 30 need not necessarily be clear but can be translucent or even opaque or comprise regions of mixed transparency. Additionally, the protective film 30 may include indicia (not shown), such as a manufacturer trademark or trade name, product description, etc.

FIG. 1 further depicts that article 10 can comprise a second label 20 in the form of a membrane overlaying and thereby sealing open end 17. Membrane 20 can be secured to lip or flange 18 by appropriate seal means including, for example, heat or pressure sensitive adhesive. Membrane 20 serves primarily a tamper evidence protective function but also serves as a supplemental closure.

The present articles essentially comprise at least one plastic piece such as cover 11 or container 12, preferably both. Each plastic piece can be the same or different in plastic composition.

FIG. 1 still further depicts that article 10 can comprise a third label 24 secured to side wall 16. Label 24 can also be secured by appropriate hot or pressure sensitive adhesive. Also, while label 24 is depicted as a single label covering only a portion of the height and perimeter of the side wall, 16, various other label sizes, number, shape, and position can be employed.

In the fabrication of first plastic piece 11 or second plastic piece 12, plastic resin is typically supplied in bulk in the form of beads or pellets having a melting temperature range. The plastic can be of one material or can comprise desired blends of plastics. To insure that the plastic resin is fully melted the mass can be heated to 175 to 190° C. and formed into a molten hot plastic mass such as in an extruder. Within this range, polymer molecules have particular temperature of crystallization values. For example, for one particular polypropylene, the majority of polymer molecules have a $T_c$ of about 162° C.

The hot plastic is fed to a piece forming apparatus such as an injection or blow molder. The mold cavity is maintained at, e.g., 50 to 90° F. In the piece forming device, the hot plastic is formed into a desired shape, rapidly cooled to below the melting point of the particular plastic and ejected or otherwise removed from the piece forming apparatus to form the shaped and cooled plastic pieces. Typically cycle times range from about 1 to 10 seconds.

While not critical, in one embodiment, lid 11 has a nominal diameter of 3.17 inches. Untreated, these shaped cooled plastic pieces typically shrink about 6 to 12 mil (0.006 to 0.012 in.)(~150 to ~300 $\mu$m) in diameter within the first 48 hours of fabrication.

While in the above description, polypropylene was particularly described, the present invention finds suitability for use in connection with a wide variety of formed pieces of thermoplastic resin. The present invention finds particular suitability for use in connection with containers especially for food items.

Suitable thermoplastic materials useful in the present invention include, but are not limited to, polyvinyl chloride; polyolefins such as polyethylene (whether high or low density); polypropylene, polypropane, polybutane; polymethyl methacrylate; polystyrene; polyester, and mixtures thereof. The polymers can be homopolymer or co-polymers or terpolymers. The resin can include pure materials or various blends of plastics. Preferred for use are polyolefins. More preferred for use herein are polypropylenes. Such materials are well known and are characterized by not only their crystallization temperatures ("$T_c$") but also by their glass transition temperature ("$T_g$").

Once formed and removed from the injection blow molding or other forming device, the formed solid plastic pieces are ready for "thermal annealing" or synonymously, "temperature aging" herein. Suitable for use as the starting material for the annealing step are plastic pieces immediately after having been discharged from the forming apparatus. As noted above, the plastic pieces shrink continuously over time especially during the first 48 hours. While cover pieces of any age can be treated according to the methods herein, the greatest benefit is enjoyed by the most newly formed pieces inasmuch as these pieces have not yet experienced natural aging shrinkage to dimensional stability that occurs naturally with time.

While not wishing to be bound by the proposed theory, it is speculated herein that the rapid cooling during the blow molding or injection molding step from a molten state to below the solidification temperature of the plastic results in various stresses and strains being captured in the solid piece especially in amorphous regions. Over time, it is speculated that the plastic molecules relax or reorient themselves to remove or reduce the stresses and strains causing the troublesome minute dimensional shrinkage.

Broadly, the present methods essentially comprise the step of physically aging by heating the shaped cooled plastic pieces to a temperature of above their respective glass transitional temperature $T_g$ but below their crystallization temperature $T_c$. The particular temperature range will vary for each plastic or blend. For polypropylene, for example, good results are obtained when plastic pieces are heated to about 150° to 170° F. (65 to 80° C.) to form heated shaped plastic pieces).

A wide variety of heating techniques can be used to practice the essential heating step. For example, the shaped cooled plastic pieces can be immersed into a hot aqueous bath for time sufficient to heat the plastic pieces to within the desired temperature range. For polypropylene pieces, preferably, the aqueous bath is maintained at a temperature within the 150° to 170° F. (65 to 80° C.) temperature range.

The particular residence time within the hot aqueous bath can depend on a variety of factors such as the shape thickness of the plastic pieces and whether the aqueous bath is quiescent or agitated, whether the bath size to number of pieces results in fluctuation of bath temperature, and other factors. When a great excess of bath to pieces is employed, good results are obtained when the residence time ranges from about five seconds to five minutes. Generally, no adverse impact has been observed when the plastic pieces are maintained at the heated temperatures for extended times within the desired temperature range.

The pieces can then be removed from the aqueous bath, dried, and cooled to room temperature. In one variation, the heated pieces are transferred from the heating bath to a second cooling bath that is maintained at room temperature. Once the heated pieces are immersed into the cooled aqueous bath, the pieces are rapidly cooled to room temperature. In other variations, the cooled aqueous bath can be chilled to below room temperatures to accelerate this step. Thereafter, the heated and cooled plastic pieces are thermally annealed and, once dried, are ready for application of a label(s).

In addition to the conduction heating in an aqueous bath, in a preferred embodiment, the heating step is practiced with radiant heating. In even more preferred embodiments, the radiant heating comprises heating with infrared light. One advantage of radiant heating especially with infrared light is the rapidity with which the heating step can be practiced. With a radiant light source suitably sized and powered, the heating step can be accomplished in about three to ten seconds, preferably about five to eight seconds. In addition to the rapidity with which the heating step can be practiced, still another advantage is that a separate drying step can be eliminated.

Once heated to the desired temperature range, the cooling step can similarly comprise various cooling techniques. Especially preferred for use herein are dry cooling techniques. For example, the heated plastic pieces can be cooled to room temperature with forced air convection cooling. The air can be at room temperature or, if desired, can be chilled to shorten the cooling steps duration.

In still another variation, ultrasonic heating can be used in substitution for the radiant heating. In still other variations, forced hot air convection heating can be employed. The pieces can be fed into a oven or other heating zones with various combinations of radiant and convection heating.

While the present physical aging is in the preferred embodiment practiced by heating or thermal annealing, other techniques can be used. Thermal annealing is preferred since simple equipment and techniques are widely and inexpensively available to practice the step. In other, less preferred embodiments, the physical aging can be practiced by applying pressure, compression, or tension for a short time, preferably within the duration times to release a described above for heating significant portion of internal stress to provide treated plastic pieces exhibiting improved dimensional stability.

Once physically aged such as by thermally annealed, the treated plastic pieces exhibit high degrees of dimensional stability by virtue of the accelerated annealing or conditioning. The treated plastic pieces are suitable for use immediately thereafter for application of a label.

An advantage of the present invention is that the conventional handling including warehousing of bulk quantities of plastic pieces can be avoided. The pieces are less susceptible to becoming dirty. Fewer broken or otherwise damaged pieces are experienced because of the reduced handling. The risk of contamination is reduced. Expensive physical handling can be minimized.

The treated pieces are especially suited for use for a subsequent inline labeling or label application step. By inline labeling herein is meant that a continuous process can be practiced from piece formation to label application. Generally, the inline label application is practiced within only a few minutes after piece formation rather than having a hiatus of one to two days to allow for natural shrinkage. Thus, in certain preferred embodiments, the present improvements in methods of preparation additionally further comprise the step of applying a label to the physical aged or thermally annealed plastic pieces. In more preferred variations the label application step is practiced within 10 to 300 seconds after forming the shaped cooled plastic pieces. This time duration includes the time used to practice the physical aging steps.

Notwithstanding the inline label application, labels applied to the present thermally annealed lids exhibit minimal shrinkage, warpage, rupture, loss of seal integrity, and other defects commonly experienced when labels are applied to untreated freshly prepared plastic pieces.

Although the present invention has been described with reference to preferred embodiments, workers skilled in the art will recognize that changes may be made in form and detail without departing from the spirit and scope of the present invention.

What is claimed is:

1. A method for treating plastic molded food container pieces subject to shrinkage over time, comprising the steps of:
   A. forming molten plastic having a glass transition temperature ("$T_g$") and a temperature of crystallization ("$T_c$") into molded plastic pieces for food containers and rapidly cooling to below the remelting point of the plastic in a mold to torm shaped cooled plastic pieces;
   B. thereafter, heating the shaped cooled plastic pieces to a temperature ("T") within a temperature range of above the $T_g$ and below the $T_c$ ($T_g<T<T_c$) to form heated shaped plastic pieces;
   C. thereafter, cooling the heated shaped plastic pieces to below $T_g$ to form thermally annealed plastic pieces; and
   D. inline labeling the thermally annealed pieces.

2. The method of claim 1, wherein step D is practiced within a few minutes after the thermally annealing plastic pieces are formed.

3. The method of claim 1, wherein in step B, the pieces are heated for about 1 to 300 seconds.

4. The method of claim 1 wherein step B is practiced by immersing the plastic pieces into a water bath.

5. The method of claim 1 wherein step B is practiced by heating the pieces with radiant heating.

6. The method of claim 5 wherein the heating step is practiced for about 3 to 10 seconds.

7. The method of claim 5 wherein the radiant heating employs infrared light.

8. The method of claim 1 wherein step B is practiced by forced hot air convection heating.

9. The method of claim 1 wherein step B is practiced by ultrasonic heating.

10. The method of claim 1 wherein step C is practiced by forced air convection cooling.

11. The method of claim 10 wherein the forced air convection cooling is practiced with room temperature air.

12. The method of claim 1 wherein step C is practiced by immersing the once heated pieces into a water bath.

13. The method of claim 1 wherein the molten plastic comprises polyolefins.

14. The method of claim 4 wherein the molten plastic consists of polyolefins.

15. The method of claim 14 wherein the molten plastic in polypropylene.

16. The method of claim 1 wherein the plastic pieces are heated to a temperature ranging from about 150° F. to 170° F. (65° C. to 85° C.).

17. The method of claim 4 wherein the water bath has a temperature of about 150° F. to 170° F. (65° C. to 85° C.).

18. A method for treating plastic molded food container pieces subject to shrinkage over time, comprising the steps of:

A. forming molten plastic having a glass transition temperature ("$T_g$") and a temperature of crystallization ("$T_c$") into molded plastic pieces for food containers and rapidly cooling to below the melting point of the plastic in a mold to form shaped cooled plastic pieces;

B. thereafter, physically aging the shaped cooled plastic pieces to form physically aged shaped plastic pieces; and C. inline labeling the physically aged shaped plastic pieces.

19. The method of claim 18 wherein step B is practiced by heating the shaped cooled plastic pieces to a temperature ("T") within a temperature range of of above the $T_g$ and below the $T_c$ ($T_g<T<T_c$) to form heated shaped plastic pieces, and additionally comprising the step of, thereafter, cooling the heated shaped plastic pieces to below $T_g$ to form thermally annealed plastic pieces.

* * * * *